UNITED STATES PATENT OFFICE.

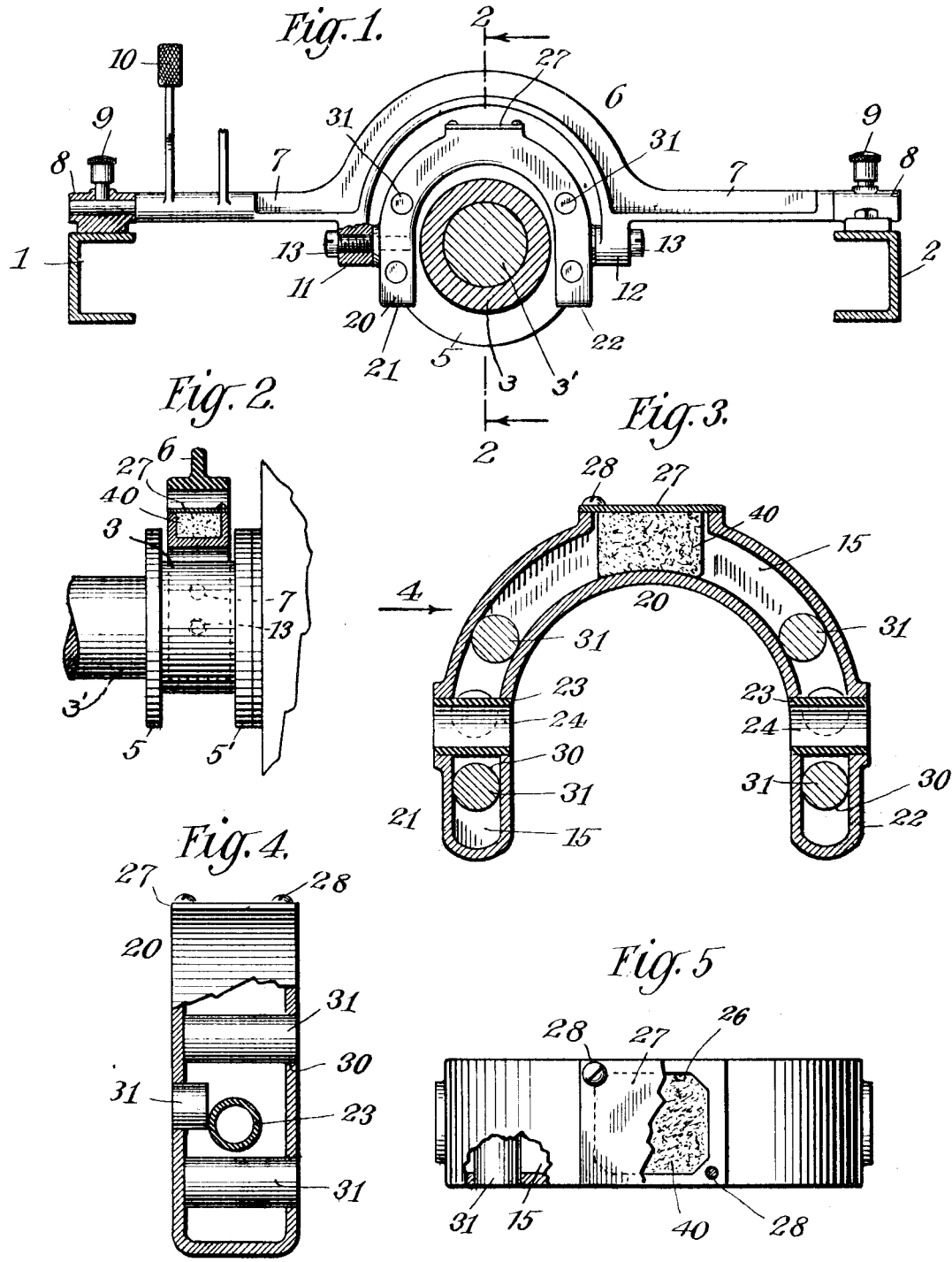

JOHN T. TRUMBLE, OF FLINT, MICHIGAN, ASSIGNOR TO CHEVROLET MOTOR COMPANY, OF FLINT, MICHIGAN, A CORPORATION OF MICHIGAN.

CLUTCH-YOKE.

1,116,171. Specification of Letters Patent. Patented Nov. 3, 1914.

Application filed February 28, 1914. Serial No. 821,646.

*To all whom it may concern:*

Be it known that I, JOHN T. TRUMBLE, a citizen of the United States, residing at Flint, in the county of Genesee, State of Michigan, have invented certain new and useful Improvements in Clutch-Yokes; and I do declare the following to be a full, clear, and exact description of the invention, such as will enable others skilled in the art to which it appertains to make, construct, and use the same.

One object of my invention is to provide a self-lubricating clutch-yoke.

Another object is to provide a construction whereby the lubrication of the portion of the mechanism involved is accomplished efficiently, neatly and without waste of lubricating material.

Another object is to so construct the mechanism comprising my invention that the yoke may be supplied with the lubricant with the same ease and despatch as in the case where an ordinary oil cup is utilized for storing oil adjacent to the parts to be lubricated so that the oil may be automatically fed to lubricate the moving parts of the mechanism.

Other objects will appear from the subjoined description and claims.

In the acompanying drawing, I have shown the invention applied to operate the usual clutch mechanism of an automobile by means of which the driving shaft is connected and disconnected to and from the engine.

With these and other objects in view, the invention consists of the novel features of construction, combination and arrangement of parts as will be more fully hereinafter described, and particularly pointed out in the appended claims.

Referring to the accompanying drawings: Figure 1 is an elevation of my improved yoke mechanism as applied to the ordinary clutch of an automobile structure, parts of said structure being shown in section. Fig. 2 is a view partly in section taken on line 2—2 of Fig. 1. Fig. 3 is a vertical section of the inner clutch yoke. Fig. 4 is an end elevation of the inner clutch yoke partly in section or viewed in the direction of the arrow 4 in Fig. 3. Fig. 5 is a plan view of the inner yoke with parts broken away to show the interior construction.

In the drawing like reference numerals refer to like parts in the various views.

1 and 2 indicate the frame portion of the chassis upon which the operative parts are mounted, 3 indicates a flanged clutch collar constructed to slide longitudinally upon the shaft 3' which is mounted on the chassis, 5 and 5' indicate the flanges upon the clutch collar, and 6 the outer yoke which is provided at each end with arms 7 mounted in bearings 8 upon the frames 1 and 2. Suitable lubricating cups 9 are provided for these bearings.

10 indicates the foot lever rigidly secured to an arm of the outer yoke 6, and 11 and 12 are arms or lugs extending below the yoke frame 6 in each of which is adjustably secured a pivot screw 13, the ends of which screws form pivot bearings upon which the inner clutch-yoke 20 is mounted. The said inner clutch-yoke 20 is U-shaped and is constructed of a suitable composition metal cast with a core 15 so as to form a structure which is hollow throughout. In each of its projecting arms 21 and 22, is secured bushings 23 formed of any suitable material, such as bronze or brass to form bearings or journals 24 for the ends of the pivot screws 13. These bearings are hermetically secured to the arms of the U-shaped yoke. In each side of the arms at substantially right angles to the bearings, I provide openings 30 extending into the cored cavity 15, which openings are filled by permanently inserted plugs of fibrous material 31, preferably of wood, which plugs extend through the cavity, one end of which abuts against the inner end of the cavity and the other end is flush with the outer bearing surface of the yoke. It is within the scope of my invention, to provide as many plugs as needful, but I have found that as a rule two plugs in each arm on the rear outer friction surface and one plug in each arm in the front outer friction surface is sufficient for lubricating purposes.

In the top of the yoke in the arch is provided a feed opening 26 which is closed by a cover 27 by means of adjusting screws 28. Just below the cover and substantially filling the upper part of the cored cavity is placed a piece of fibrous material, preferably felt, indicated at 40, to prevent undue splashing and leaking of the lubricant from the yoke.

In the operation of my invention, the cover 27 is temporarily removed by removing a fastening screw and swinging the cover around the other screw and the piece of felt 40 is also removed from its place in the core. The lubricating material is then inserted in the core of the inner yoke substantially filling the same. The preferred size of the core is sufficient to hold approximately one-quarter of a pound of grease. The felt piece is then inserted and the cover is screwed in place.

Upon rocking the outer yoke frame by means of the lever, as shown, or by other suitable means, power is applied to the inner yoke structure through the rocking of the outer yoke to disconnect the clutch of the automobile against the usual spring pressure applied thereto. When the pressure on the yoke is released, the clutch is moved into opposite position by the usual clutch spring or otherwise, and the inner yoke will assume an upright position upon its pivots between the flanges of the clutch collar. When the clutch is engaged the yoke is of such a size that it will rest in the space between the clutch collar without undue friction thereon. The lubrication of parts is accomplished by the slowly oozing of the grease or lubricating material through the pores of the fibrous plugs which are inserted in the walls of the yoke, and this renders a sufficient lubrication of the moving parts for all practical purposes, the plugs tightly engaging the walls of the yoke.

As has been stated, by the use of my invention, the lubrication of the parts of the mechanism to which it is applied is efficiently accomplished without undue waste of material and without causing the accumulation of dirt and spattering of oil which would otherwise take place.

It is to be understood that the embodiment of my invention as described and illustrated, is exemplary and that detailed changes may be made in the construction thereof without departing from the spirit thereof, or its scope as defined by the subjoined claims.

Having described my invention, what I claim as new and desire to secure by Letters Patent is:—

1. A clutch-yoke having a bearing surface and provided with means within itself to hold a supply of lubricant and to apply the lubricant to the bearing-surface.

2. A clutch yoke having an outer bearing surface and provided with a cavity and a fibrous connection between the said bearing surface and cavity.

3. A clutch yoke provided with a cavity, a wall of the yoke having an opening therethrough communicating with the cavity, and a fibrous material in said opening.

4. A clutch yoke provided with a cavity, one of the walls thereof having a bearing surface, and having minute passages between the cavity and the bearing surface.

5. An inner clutch yoke having suitable bearing surfaces and which is provided with a cavity throughout and a fibrous connection between an outer bearing surface and the cavity.

6. An inner clutch yoke of the class described having a plurality of bearing surfaces, and provided with a cavity throughout and fibrous connections between the cavity and the bearing surfaces.

7. A clutch yoke of the class described of substantial U shape, having a cavity therein extending throughout the same and provided with a plurality of bearing surfaces, and provided also with an opening through one of the walls thereof for the insertion of lubricating material into the cavity, a cap or cover for said opening, means for detachably securing the cover in place and fibrous material inserted in the cavity at the opening, fibrous plugs extending from the cavity through the walls of the yoke to the bearing surfaces thereof.

8. In combination with a flanged clutch-collar of means for supporting the same, a yoke, and means for supporting the yoke in juxtaposition to the flanges of the collar, said yoke being provided with means within itself to hold a supply of lubricant, and means to apply the lubricant to the surface thereof adjacent to a flange.

9. A self contained lubricating clutch yoke provided with a cavity and having a friction bearing surface part of which surface is of fibrous material connecting with the cavity.

10. An inner yoke provided with oppositely arranged friction bearing surfaces, journaled bushings secured to the arms of the yoke, fibrous material extending from the friction surfaces of the yoke into its core, and arranged substantially at right angles to the bushings.

11. A hollow inner clutch yoke, provided with oppositely disposed friction walls having fibrous filled openings therein and outer and inner non-friction walls, journal bearings secured to the yoke and an adjustable door or window in the outer wall thereof.

In witness whereof I have hereunto set my hand at the city of Flint, county of Genesee and State of Michigan, this 21st day of February, 1914.

JOHN T. TRUMBLE.

In presence of—
A. B. C. HARDY,
GERTRUDE WHITACRE.